(No Model.) 4 Sheets—Sheet 1.

S. H. SHORT.
SYSTEM OF ELEVATED CONDUCTORS FOR ELECTRIC RAILWAYS.

No. 401,797. Patented Apr. 23, 1889.

ATTEST:
George W. Murray
Morris Arnheim

INVENTOR,
Sidney H. Short,
By his Attorney
Edward P. Thompson (No Model.) 4 Sheets—Sheet 2.

S. H. SHORT.
SYSTEM OF ELEVATED CONDUCTORS FOR ELECTRIC RAILWAYS.

No. 401,797. Patented Apr. 23, 1889.

(No Model.) 4 Sheets—Sheet 3.
S. H. SHORT.
SYSTEM OF ELEVATED CONDUCTORS FOR ELECTRIC RAILWAYS.
No. 401,797. Patented Apr. 23, 1889.
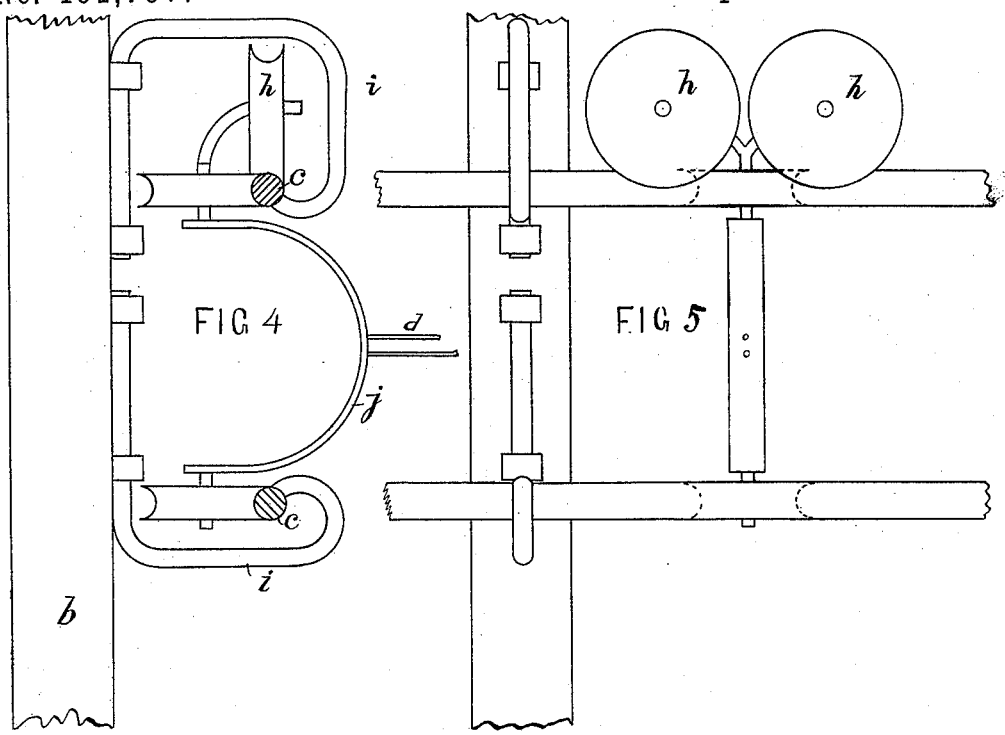
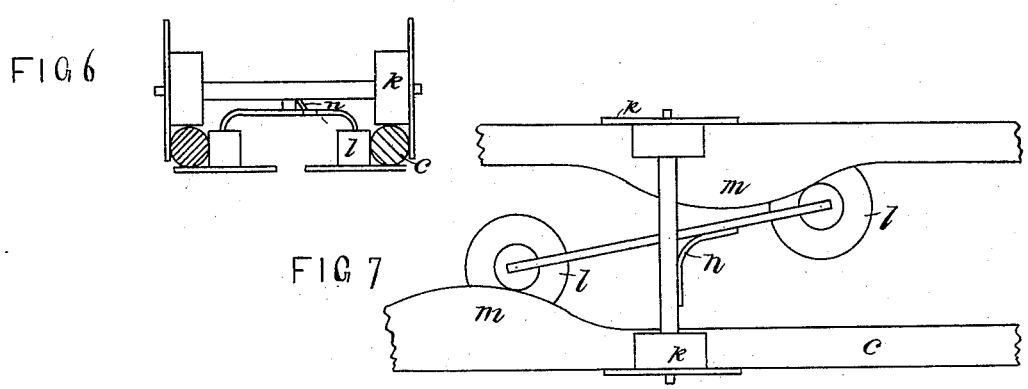
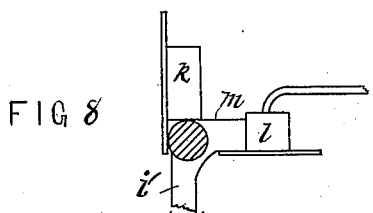
ATTEST;
George H. Murray
Morris Arnheim
INVENTOR,
Sidney H. Short,
By his Attorney
Edward P. Thompson,

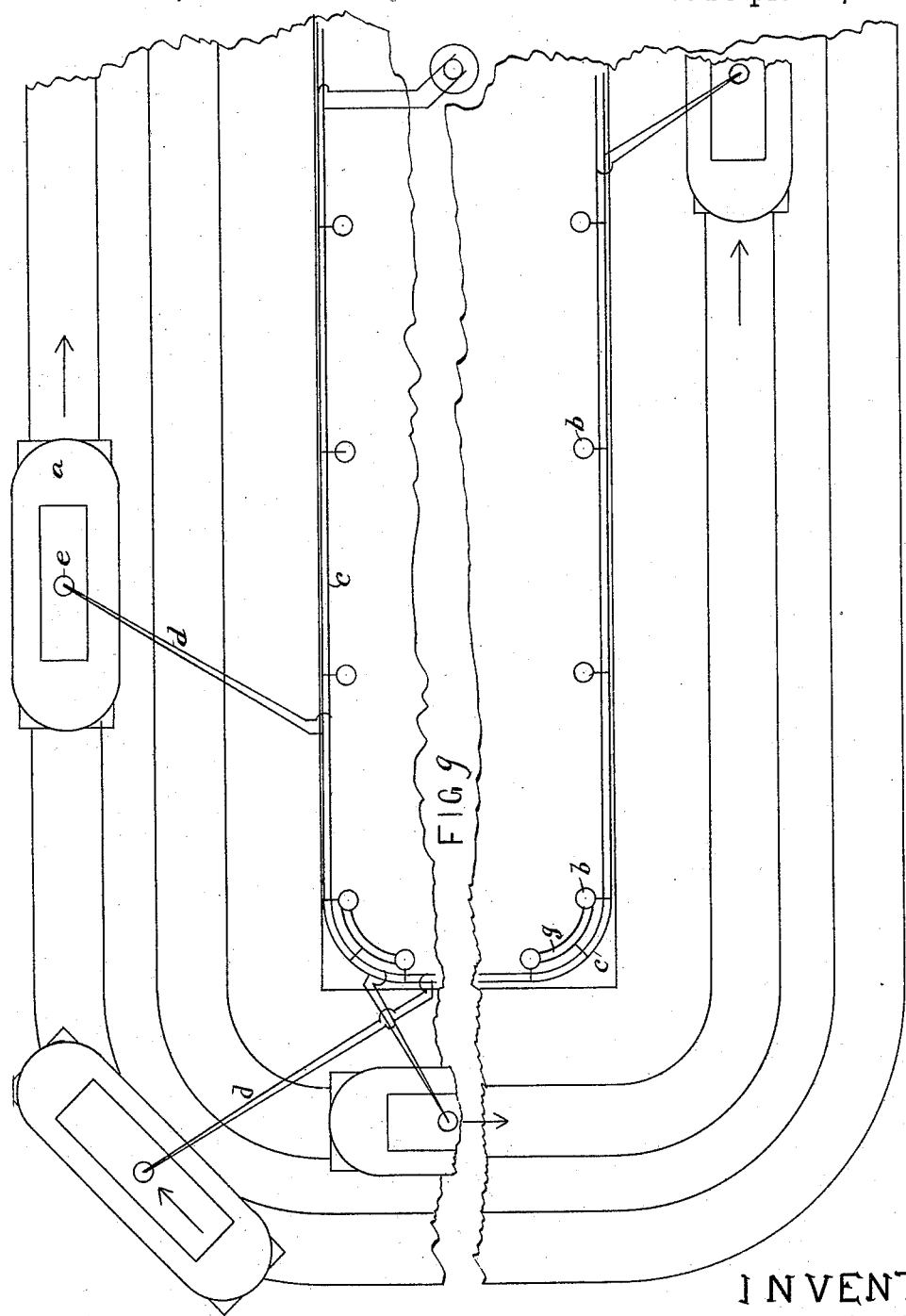

UNITED STATES PATENT OFFICE.

SIDNEY H. SHORT, OF COLUMBUS, OHIO.

SYSTEM OF ELEVATED CONDUCTORS FOR ELECTRIC RAILWAYS.

SPECIFICATION forming part of Letters Patent No. 401,797, dated April 23, 1889.

Application filed July 17, 1888. Serial No. 280,217. (No model.)

*To all whom it may concern:*

Be it known that I, SIDNEY H. SHORT, a citizen of the United States, and a resident of Columbus, in the county of Franklin and State of Ohio, have invented certain new and useful Improvements in Systems of Elevated Conductors for Electric Railways, of which the following is a specification.

My invention relates to a system of elevated conductors in which the poles are located at a horizontal distance from the railway. The improvement relates to the means of forming a connection between the elevated conductors and the electric car.

Figure 1:
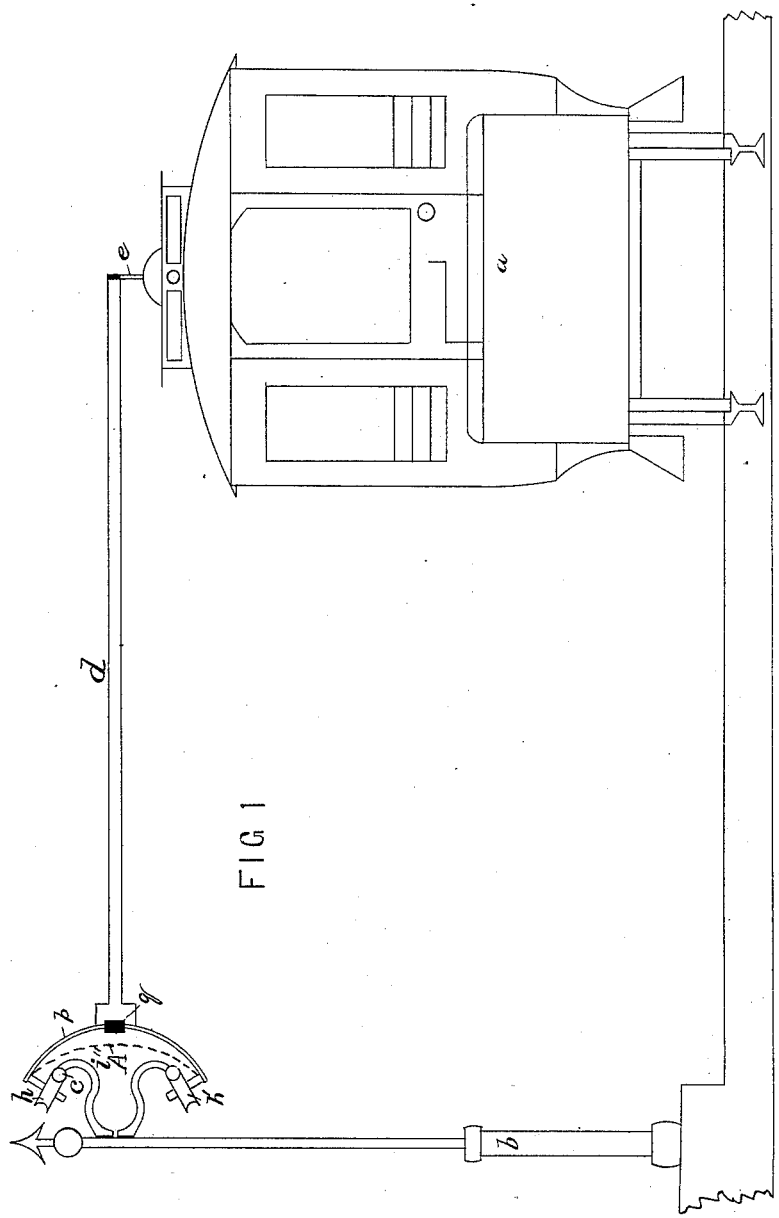
Figure 2:
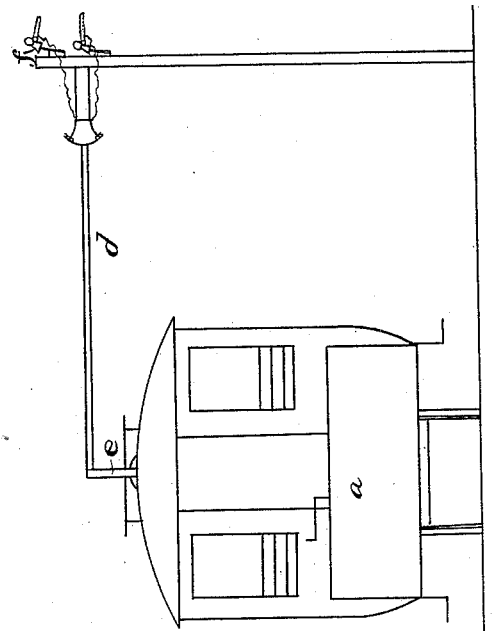
Figure 2:
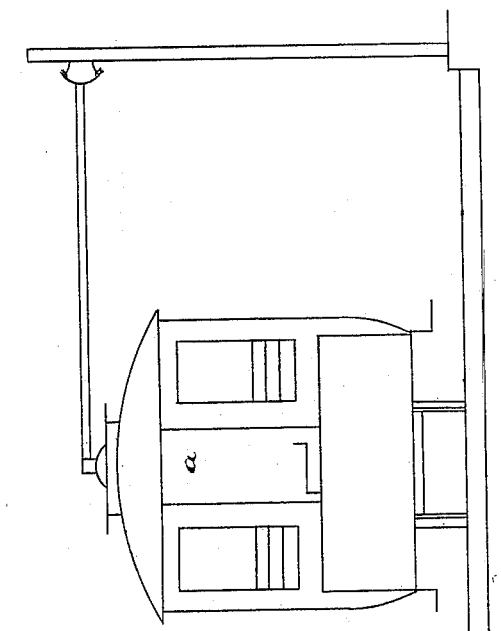
Figure 2:
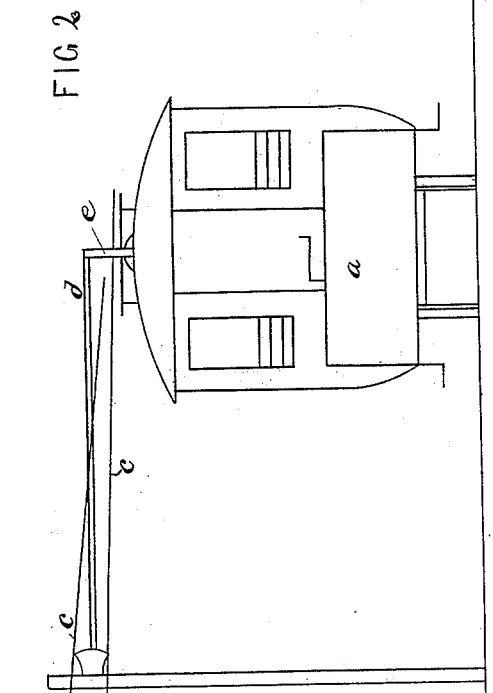
Figure 3:
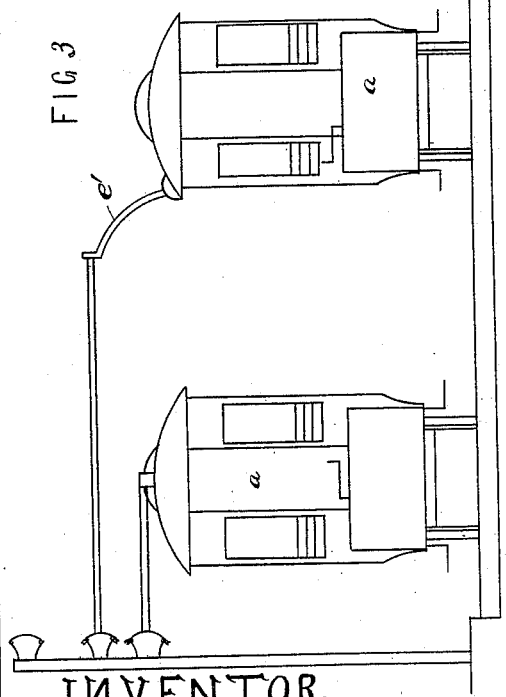

In the accompanying drawings, Figure 1 is a view in elevation of the invention applied to a single track, showing the end of the car. Fig. 2 is a similar view in regard to a continuous double track. Fig. 3 represents similarly a triple track, showing that cars may be operated by those electrical collectors which are on the same line of poles by placing the collectors above each other. It is evident that any number of tracks in a street may be equipped with my invention. Figs. 4, 5, 6, 7, and 8 are various views of practical electric collectors which may be employed for running on the wires at the side of the street. Fig. 5 is a view at right angles of Fig. 4, which is one form of collector. Fig. 6 is another form. Fig. 7 is a plan view of Fig. 6; and Fig. 8 is a view of a portion of Fig. 6, showing how the conductor is supported, so that the support will not interfere with the wheels of the collector. Fig. 9 is a plan view of a complete system for two tracks, including a representation of how corners are turned and how cars pass each other without the wires interfering, the said wires being those which connect the collectors with the cars.

Referring particularly to Figs. 1, 2, 3, and 9, the system consists of the combination of cars $a$, which may be provided with suitable electric motors, (not shown,) poles $b$ at the side of the street, electrical conductors $c$, supported on the poles in such a manner that electrical collectors may run thereon without interfering with the poles, and flexible conductors $d$, extending from the poles to the car. It is preferable to have the wires or flexible conductors $d$ horizontal, so that the conductors $c$ are supported on about the same level as the tops of the cars. The conductors $d$ may be passed through the cars by first connecting them to supports $e$ on the tops of the cars or to lateral supports $e'$, which may be bent toward the poles. Insulators for supporting the feeders may be placed on the opposite side of the poles, as represented at $f$. In Fig. 9 the cars are shown as connected up in multiple arc merely for illustration; but it is to be understood that they may be connected up in series or in any other manner known in the art. The broken line in this figure shows that portions of the block are broken away. At the street corners a simple form of curve may be made by joining two posts by a curved piece, $g$, which may serve to hold up the main conductors $c$. Other ways equally simple may be devised by those posted in the art without departing from the spirit of the invention.

If it is desired to have the main conductors the one above the other, as in Figs. 4 and 5, the collector has two vertical wheels, $h$, on the upper conductor and an additional wheel (horizontal) pressing laterally upon each of the conductors, the wheels being suitably arranged and supported, so as to form a vehicle for traveling upon the conductors. Supports $i$ for the conductors $c$ are fastened to the poles $b$, and the flexible conductors $d$ are connected to a bow-shaped piece, $j$, which joins the lower and upper wheels.

In Figs. 6, 7, and 8 the conductors $c$ are substantially on the same level. Vertical wheels $k$ and horizontal wheels $l$ press upon and are adapted to run upon the conductors, while the latter have lateral projections $n$ for preventing the flanges of the wheels $l$ from striking the conductor-support $i'$. The axles of the vertical and horizontal wheels may be pivoted to each other and a spring, $n'$, be connected to both, so that the horizontal wheels will press against the conductors properly.

In Fig. 1 the collector is seen to consist of the combination of two wheels or pulleys placed the one above the other and at an angle to each other and connected together by a spring, $p$, which tends to press the wheels upon the conductors $c$, which are also arranged in a vertical plane. Curved arms $i''$ support the conductors $c$ and are attached to the poles $b$.

As represented in the drawings, (see, for instance, Fig. 1,) the conductors passing from the main conductors $c$ to the car are of the usual size for carrying a sufficient current for propelling a car, and are horizontal and rectilinear, showing, as they are, that they are flexible and under tension or taut. The degree of tension may evidently be varied; but it is preferable to make it such that the conductors are not likely to break, and yet so that there is considerable pressure of the collectors against the conductors $c$, so as to produce practically perfect electrical contact, and so as to prevent the collectors from leaving the conductors $c$. By the word "taut" it is intended to convey the above degree of tension. It is evident that there are irregularities of relative motion between the car and the collectors. The spring $p$ serves to regulate the irregularities, so that, as the wires are under tension, the collectors will not jump away from the conductors $c$. By being flexible it is evident that the conductors $d$ are not so liable to breakage, for if anything leans against them they will bend and yield; also, their flexibility establishes their great lightness over rods or similar stiff conductors.

At the street corners may be seen curved pieces $g$, which are of any suitable strong material, attached at each end to the poles, and all so arranged that the curve of the piece or support $g$ is similar to the curve of the railway-track. If the latter is a quarter of a circle, the former is also the same, only with a radius of less length. The two poles to which this piece $g$ is attached at each corner are located from two to ten feet in each direction from the corner. The conductors $c$ are supported both from these two poles and from the support $g$, so that the conductors at the corner are of a similar curvature to the curve of the track. The dotted line A shows the original position of the spring $p$, thereby indicating that the spring has been subjected to strain and is under tension when the wires $d$ are taut and fastened to the car. It is equally true that the wires $d$ are under tension, being under a pulling strain.

I claim as my invention—

In a system of elevated conductors for electric railways, the combination of one conductor above the other in a vertical plane and parallel to the railway, metallic wheels thereon and standing at an angle to the vertical, the planes of the wheels forming an angle which points toward the railway, a spring in two insulated portions connecting the said wheels, and two electrical conductors under tension and connected, respectively, to the said two portions of the spring, the other ends of the last-named conductors being connected to an electric car, and the direction of tension being such as to force the wheels against the conductors upon which the same are mounted.

In testimony that I claim the foregoing as my invention I have signed my name, in presence of two witnesses, this 18th day of June, 1888.

SIDNEY H. SHORT.

Witnesses:
D. E. PUTNAM,
E. W. MIX.